E. W. REED.
MOTOR DRIVEN BUCK RAKE.
APPLICATION FILED APR. 27, 1920.
1,384,919.
Patented July 19, 1921.
3 SHEETS—SHEET 3.
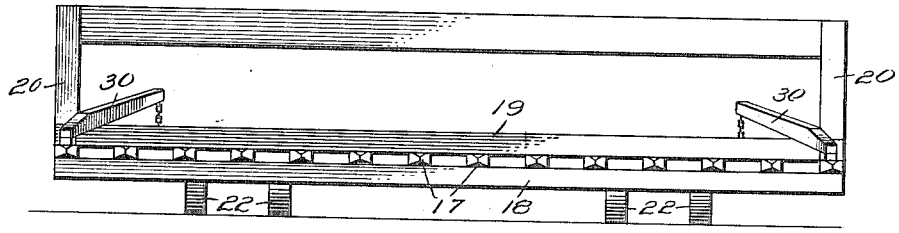
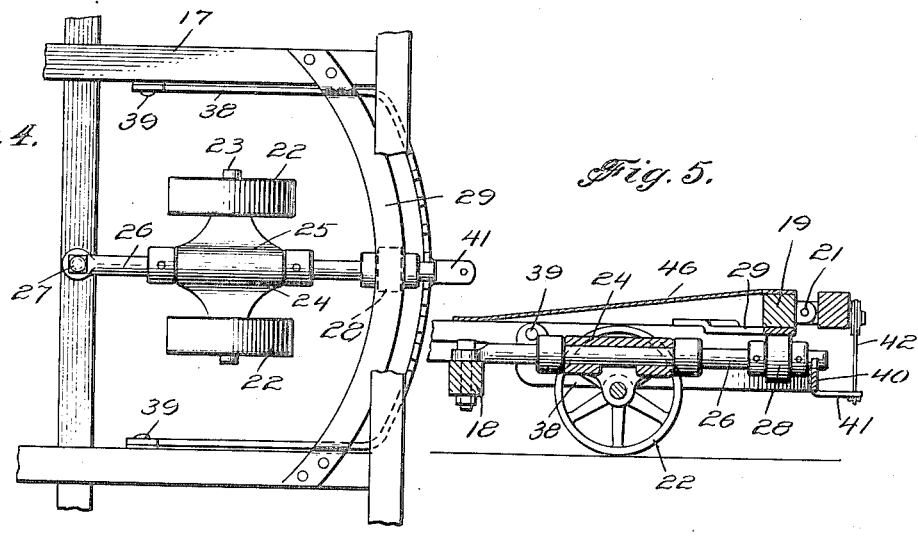
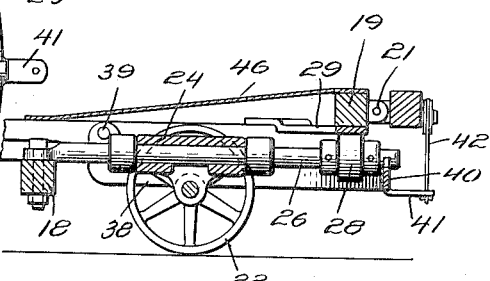
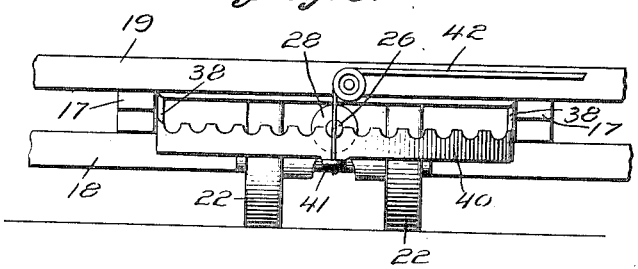
Inventor
E. W. Reed.
By Geo. P. Kimmel.
Attorney

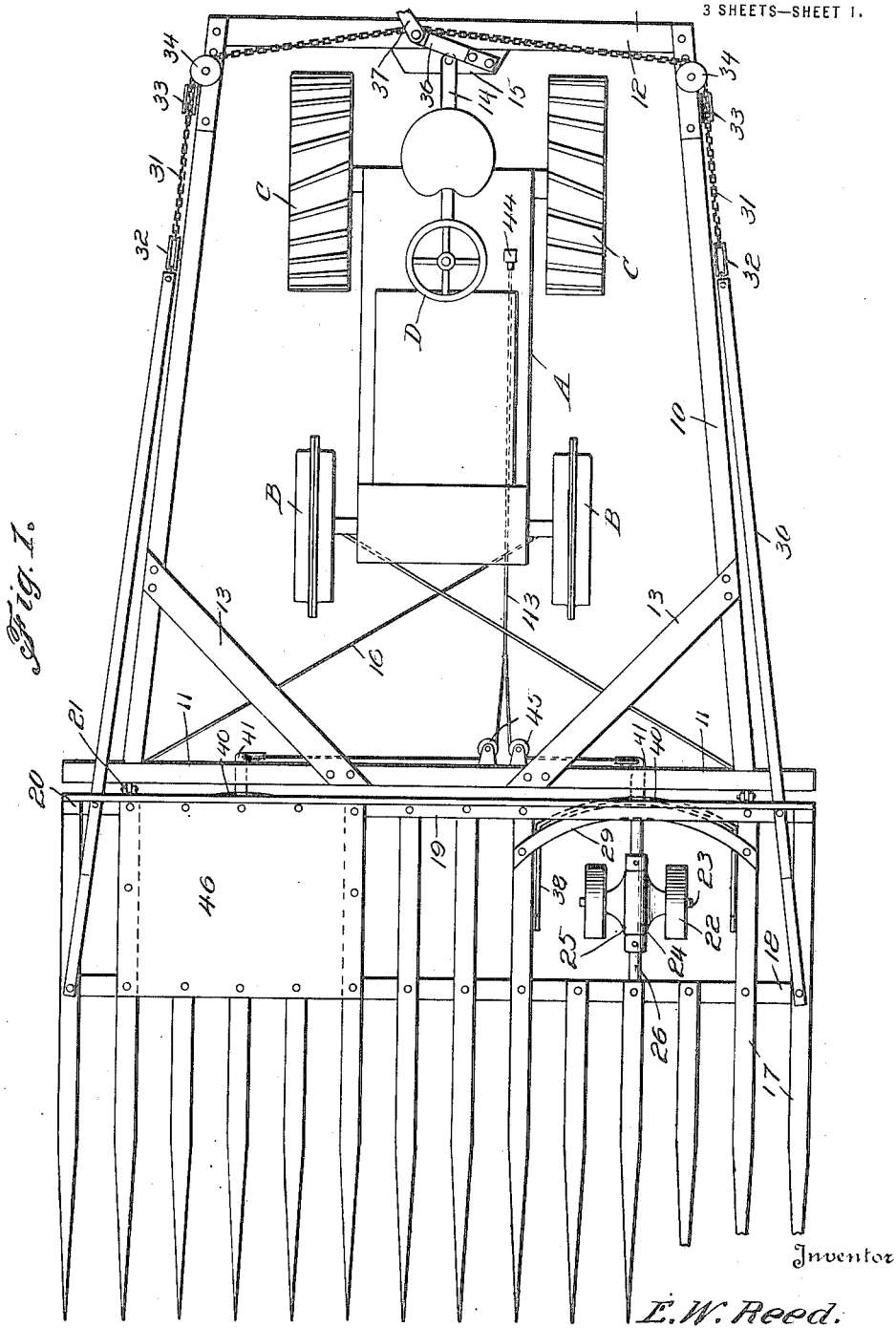

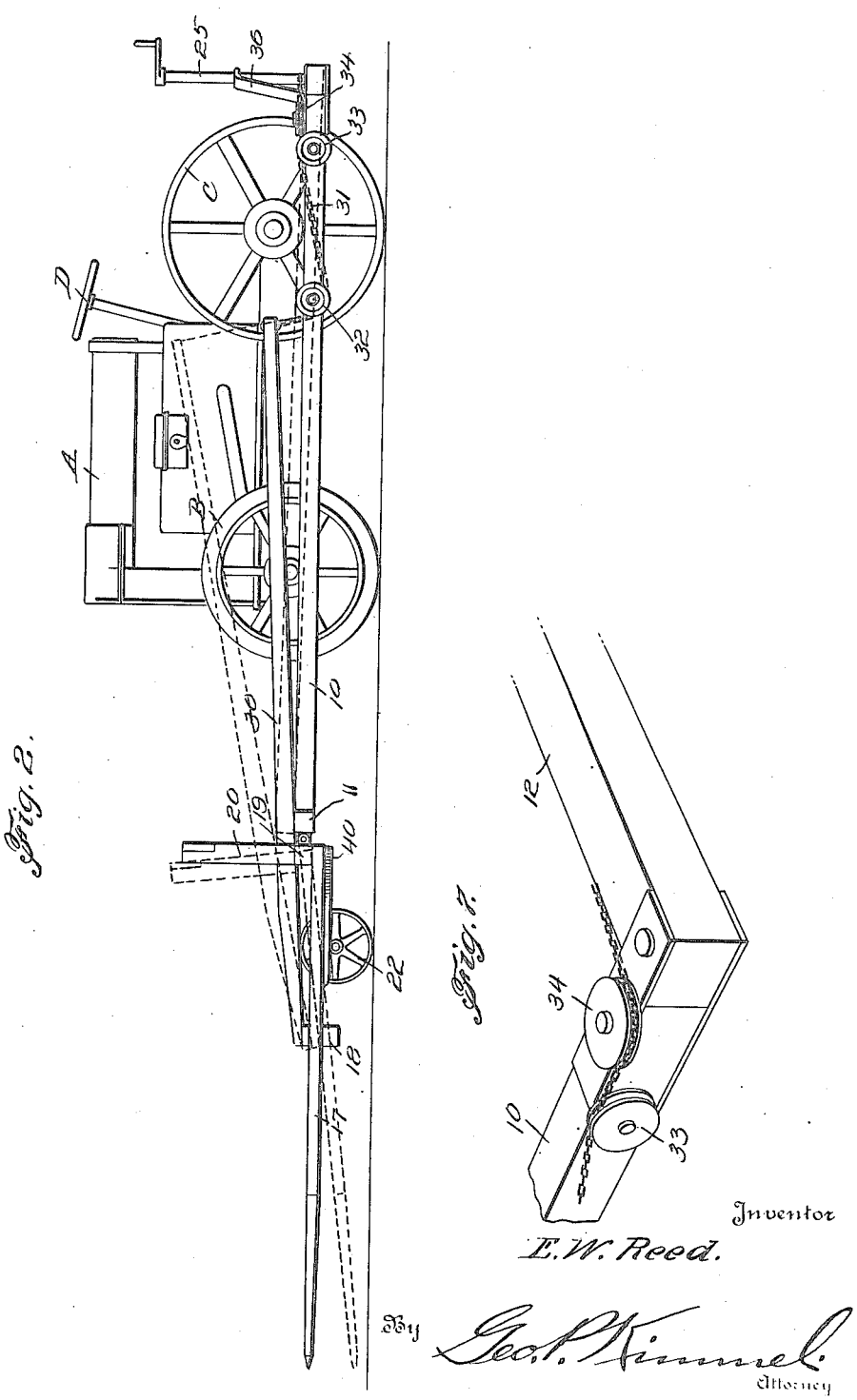

UNITED STATES PATENT OFFICE.

EARL W. REED, OF SUNNYSIDE, WASHINGTON.

MOTOR-DRIVEN BUCK-RAKE.

1,384,919.   Specification of Letters Patent.   Patented July 19, 1921.

Application filed April 27, 1920. Serial No. 376,899.

*To all whom it may concern:*

Be it known that I, EARL W. REED, a citizen of the United States, residing at Sunnyside, in the county of Yakima and State of Washington, have invented certain new and useful Improvements in Motor-Driven Buck-Rakes, of which the following is a specification.

The invention relates to a hay or grain rake, and more particularly to the class of motor driven buck rakes for use in gathering crops.

The primary object of the invention is the provision of a rake of this character, wherein the main frame thereof is constructed and arranged to accommodate a tractor of the motor propelled type which when fastened to the rake will serve to move the same for the gathering of cut hay, straw, grain or the like when advanced over a field.

Another object of the invention is the provision of a rake of this character, wherein the ground wheels thereof are mounted so as to be capable of traveling over uneven surfaces and to guide the rake when being advanced by a tractor, which is attached thereto in a novel manner for the driving of the same, the ground wheels being locked against turning action when the tractor is backed with the rake so as to avoid any relative irregular lateral movement of said rake during rearward travel of the tractor.

A further object of the invention is the provision of a rake of this character, wherein the fork thereof is capable of vertical adjustment and is controlled by the operator of the tractor, while the ground wheels of said rake during advancement of the latter by the tractor are free for swinging movement so that the rake will be properly guided when being driven by the tractor, the ground wheels being supported in the rake in a novel manner so that the same will properly support the rake at the forked end thereof when traveling over smooth or irregular surfaces and the ground wheels can be locked against swinging movement when it is desired to reverse the direction of travel or on the backing of the tractor as the occasion may demand.

A still further object of the invention is the provision of a rake of this character, wherein the construction thereof enables the convenient attachment of a tractor so that the latter can be utilized for the driving of said rake when in use for gathering crops.

A still further object of the invention is the provision of a rake of this character which is comparatively simple in construction, strong yet light in weight, thoroughly reliable and efficient in its purpose and inexpensive to manufacture.

Other objects will be in part obvious and in part hereinafter pointed out. The invention accordingly consists in the elements and the arrangement thereof, the construction of which will be exemplified in the following description and its scope of application will be indicated in the claims hereunto appended.

In the accompanying drawing:

Figure 1 is a top plan view of a rake constructed in accordance with the invention showing the tractor applied thereto.

Fig. 2 is a side elevation.

Fig 3 is a front elevation of the fork or front end of the rake, the distant parts being eliminated.

Fig 4 is a fragmentary enlarged detail plan view of one pair of ground wheels showing the mounting thereof and the locking yoke for preventing the swinging of said pair of ground wheels.

Fig 5 is a fragmentary vertical longitudinal sectional view taken centrally of Fig. 4.

Fig 6 is a fragmentary rear elevation of the parts as assembled in Figs. 4 and 5.

Fig 7 is a fragmentary detail perspective view of the rear corner portion of the main frame of the rake showing the guide pulleys.

Similar reference characters indicate corresponding parts throughout the several views in the drawings.

Referring to the drawings in detail, particularly Figs. 1 and 2, A designates generally a motor propelled tractor which may be of any preferred type, in this instance of the four-wheel construction, the front steering wheels B thereof being turned for the guiding of the tractor A in the usual manner, while the rear traction wheels C are driven by the motor of the tractor A. As usual the hand steering wheel D of the tractor A is manually manipulated by the operator of the tractor for the turning of the front guide wheels B so as to direct the course of the tractor in the travel thereof.

Adapted to be driven and attached to the tractor A is the buck rake which comprises a main frame including the forwardly divergent side beams or rails 10, front cross sill or beam 11 and the rear cross sill or beam 12, the side beams or rails 10 being united to the front and rear beams or sills 11 and 12, respectively in any suitable manner, so as to constitute an open main frame, preferably of the shape shown in Fig. 1 of the drawing. Fixed to the side beams or rails 10 of the main frame and to the front beam or sill 11 are diagonally disposed braces 13, which serve to make rigid the main frame which is adapted to have located therein the tractor A, preferably in the position as shown in Figs. 1 and 2 of the drawing.

The tractor A is equipped with a rear end coupler 14, which is detachably fastened in any suitable manner to a keeper 15, centrally of the rear beam or sill 12 of the main frame, while connected to the forward corners of said main frame, preferably to the front beam or sill 11, thereof, and to the chassis of the tractor A, at its forward end are crossed stay rods 16, which serve to sustain the tractor in position in the main frame of the rake at the center line of draft thereof.

Swingingly supported for vertical adjustment forwardly of the main frame of the rake is a load gathering fork comprising the series of forwardly extending equally spaced apart tines 17, secured to a head having the front and rear transverse base bars 18 and 19 respectively and the upstanding or vertical guard 20, the rear base bar 19 being connected with the front beam or sill 11 of the main frame through the medium of pivot hinges 21, so that vertical adjustment of the fork can be had in a manner presently described.

Arranged in the head of the fork on opposite sides of the center line of draft of the rake are pairs of ground wheels 22, each pair being journaled upon the spindle ends 23, of a rocking axle casting 24, having a central sleeve-like bearing 25, loosely journaled upon a turning or swinging hanger 26, which at its forward end is pivoted by a king bolt 27 to the forward transverse bar 18 of the head of the fork, while rotatably supported upon this swinging hanger 26 spaced from its rear end is an anti-friction roller 28, adapted to travel upon an arcuate shaped track rail 29, secured to certain of the tines 17 to be disposed rearwardly of the pair of ground wheels 22, the anti-friction roller 28 being designed to travel upon the under surface of the said track rail 29 on the turning of the swinging hanger 26 when the rake is being advanced by the tractor A as the ground wheels 22 will support and guide the fork end portion of the rake during the travel thereof.

Fixed to the head end of the fork at opposite side portions of the latter are rearwardly extending convergent adjusting arms or raising and lowering levers 30, which have connected to their rear free ends controlling chains 31, the same being trained over the respective guide pulleys 32, 33 and 34, carried by the side beams or rails 10 of the main frame, the chains 31 being also adapted to be wound on and unwound from a vertically disposed windlass shaft 35, supported in a bracket 36, secured to the rear end cross beam or sill 12 of the main frame and this shaft 35 has connected therewith a hand crank 37 in convenient reach of the operator of the tractor for manual manipulation so that the fork of the rake can be raised and lowered or adjusted by the operator of the tractor to a position for gathering the crop in a field, and for the carrying of a load after the gathering thereof, upon the fork.

Swingingly mounted in the head of the fork adjacent to the pairs of ground wheels 22, are locking devices each comprising a substantially U-shaped yoke 38, having its ends pivoted at 39 to the head of the fork, the rear closed portion of the yoke being constructed to provide an arcuate shaped toothed locking rack 40 for engaging the rear end of the swinging hanger 26 to hold the same against swinging movement, this being designed when the tractor A is backed with the rake so as to avoid relative movement of the latter laterally with respect to the tractor. Connected with the locking yokes 38, medially thereof through the medium of the ears 41 are the branch cables 42 of a main controlling cable 43, which is connected with a foot pedal 44 suitably mounted in the chassis of the tractor A so that when it is desired to lock the swinging hangers 26 by the yokes 38 the operator of the tractor A manipulates the foot pedals 44 so as to move the yokes 38 to locking position, the branch cables 42 being trained over the guide pulleys 45 carried by the front beam or sill 11 of the main frame of the rake. It is of course understood that when the rake is advanced by the tractor A the locking yokes 38 are normally in lowered position out of engagement with the swinging hangers 26 so that the latter are free for swinging movement to permit the ground wheels 22, to guide the front or rake end of the rake correspondingly to the direction of travel of the tractor A which is manually operated for the guiding thereof, by the operator of the same.

When the tractor A is to be backed or propelled rearwardly the operator manually sets the locking yokes 38 so as to lock the swinging hangers 26, against swinging movement and in this manner, the rake will follow the backward movement of the tractor A corresponding to the direction of travel thereof, without any irregular relative movement of the rake with respect to the tractor.

The head of the fork of the rake has fitted thereon covering plates 46 which overlie the ground wheels 22 and serve as guards or shields to prevent the hay, straw or the like carried upon the fork from interfering with the ground wheels or becoming twisted upon the spindles 23, supporting said ground wheels.

From the foregoing it is thought that the construction and manner of operation of the rake in conjunction with the tractor will be clearly understood and therefore a more extended explanation has been omitted.

What is claimed is:

1. In a rake, a wheeled rake head, a frame rearwardly of said head and pivotally connected thereto, the frame being supported in substantially horizontal position and having an open center, and a tractor located in the open center of said frame, having detachable connection therewith, and means on the frame and connected with the head to vary the disposition of said head and frame relative to each other, hangers for the wheels of said head, and means for adjusting the hangers to permit the guiding of the head.

2. In a rake, a wheeled rake head, a frame rearwardly of said head and pivotally connected thereto, the frame being supported in substantially horizontal position and having an open center, and a tractor located in the open center of said frame, having detachable connection therewith, and means on the frame and connected with the head to vary the disposition of said head and frame relative to each other, hangers for the wheels of said head, means for adjusting the hangers to permit the guiding of the head, and stay rods disposed in cross-relation of each other forwardly of the tractor and having connection therewith, and also with the frame at the forward end thereof.

3. In a rake, a wheeled rake head, a frame rearwardly of said head and pivotally connected thereto, the frame being supported in substantially horizontal position and having an open center, a tractor located in the open center of said frame, having detachable connection therewith, rocking and swinging supports for the wheels of the head, and means for adjustably holding the supports against swinging movement.

4. In a rake of the character described, a main frame, a tractor located in and connected with the main frame, a fork connected with the main frame at the forward end thereof, ground wheels supporting the fork forwardly of the main frame to guide said fork over even and uneven surfaces and means on the main frame and connected with the fork to permit vertical adjustment of said fork, swinging hangers for supporting the ground wheels, and manually operable means for locking the hangers against swinging movement.

5. In a rake of the character described, a main frame, a fork pivotally connected with the main frame for vertical adjustment, hangers pivotally supported on the fork, ground wheels having axle castings loosely connected to the hangers, locking yokes pivotally connected to the fork and engageable with the hangers to lock the same against swinging movement, and means for controlling the locking means.

6. In a rake of the character described, a main frame, a fork pivotally connected with the main frame for vertical adjustment, hangers pivotally supported on the fork, ground wheels having axle castings loosely connected to the hangers, locking yokes pivotally connected to the fork and engageable with the hangers to lock the same against swinging movement, means for controlling the locking means, anti-friction rollers carried by the hangers and tracks on the fork and engaged by the anti-friction rollers.

7. In a rake of the character described, a main frame, a fork pivotally connected with the main frame for vertical adjustment, hangers pivotally supported on the fork, ground wheels having axle castings loosely connected to the hangers, locking yokes pivotally connected to the fork and engageable with the hangers to lock the same against swinging movement, means for controlling the locking means, anti-friction rollers carried by the hangers and tracks on the fork and engaged by the anti-friction rollers and means on the main frame and connected with the fork for vertically adjusting the same.

8. In a rake of the character described, a main frame, a fork pivotally connected with the main frame for vertical adjustment, hangers pivotally supported on the fork, ground wheels having axle castings loosely connected to the hangers, locking yokes pivotally connected to the fork and engageable with the hangers to lock the same against swinging movement, means for controlling the locking means, anti-friction rollers carried by hangers and tracks on the fork and engaged by the anti-friction rollers, means on the main frame and connected with the fork for vertically adjusting the same, and a motor propelled tractor located within the main frame and having connection therewith for driving the rake.

9. In a rake of the character described, a main frame, a fork pivotally connected with the main frame for vertical adjustment, hangers pivotally supported on the fork, ground wheels having axle castings loosely connected to the hangers, locking yokes pivotally connected to the fork and engageable with the hangers to lock the same against swinging movement, means for controlling the locking means, anti-friction rollers carried by hangers and tracks on the fork and engaged by the anti-friction rollers, means on the main frame and connected with the fork for vertically adjusting the same, a motor propelled tractor located within the main frame and having connection therewith for driving the rake, and a foot pedal on the tractor and co-acting with the connections with the locking means for the hangers to actuate said locking means.

10. The combination with a motor propelled tractor of a rake comprising a main frame detachably connected with said tractor, a fork forwardly of and pivotally connected for vertical adjustment with the main frame, ground wheels supporting said fork, hangers pivotally supporting the ground wheels for the guiding of the fork when driven by the tractor, means on the main frame for adjusting the fork, and adjustable means for locking the hangers against movement to sustain the ground wheels in a fixed relation to the fork.

11. The combination with a motor propelled tractor of a rake comprising a main frame detachably connected with said tractor, a fork forwardly of and pivotally connected for vertical adjustment with the main frame, ground wheels supporting said fork, hangers pivotally supporting the ground wheels for the guiding of the fork when driven by the tractor, means on the main frame for adjusting the fork, adjustable means for locking the hangers against movement to sustain the ground wheels in a fixed relation to the fork, and tracks on the fork, and anti-friction rollers on the hangers and movable over the tracks when said hangers are free from the locking means.

In testimony whereof I affix my signature hereto.

EARL W. REED.